United States Patent
Matsunaga

(10) Patent No.: US 9,904,779 B2
(45) Date of Patent: Feb. 27, 2018

(54) TERMINAL DEVICE FOR LOCKING OPERATION ON APPLICATION PROGRAM, AND METHOD AND PROGRAM FOR THE SAME

(71) Applicant: NEC CASIO MOBILE COMMUNICATIONS LTD., Kawasaki-shi, Kanagawa-ken (JP)

(72) Inventor: Ayako Matsunaga, Kawasaki (JP)

(73) Assignee: NEC CORPORATION, Tokyo (JP)

(*) Notice: Subject to any disclaimer, the term of this patent is extended or adjusted under 35 U.S.C. 154(b) by 591 days.

(21) Appl. No.: 13/761,734

(22) Filed: Feb. 7, 2013

(65) Prior Publication Data
US 2014/0223058 A1   Aug. 7, 2014

(51) Int. Cl.
G06F 21/52 (2013.01)
G06F 21/30 (2013.01)
G06F 21/32 (2013.01)

(52) U.S. Cl.
CPC .............. G06F 21/52 (2013.01); G06F 21/30 (2013.01); G06F 21/32 (2013.01)

(58) Field of Classification Search
None
See application file for complete search history.

(56) References Cited

U.S. PATENT DOCUMENTS

| | | | | |
|---|---|---|---|---|
| 2005/0257050 A1* | 11/2005 | Gierens | G06F 21/31 | 713/165 |
| 2009/0083850 A1* | 3/2009 | Fadell et al. | | 726/19 |
| 2009/0137284 A1* | 5/2009 | Liyanaarachchi | | 455/567 |
| 2010/0183137 A1* | 7/2010 | Dierenbach | | 379/207.02 |
| 2013/0036377 A1* | 2/2013 | Colley | | 715/764 |
| 2013/0109369 A1* | 5/2013 | Forutanpour | A61B 5/1072 | 455/418 |
| 2014/0123273 A1* | 5/2014 | Matus | G06F 21/32 | 726/17 |

(Continued)

FOREIGN PATENT DOCUMENTS

JP   11-308333 A   11/1999
JP   2000-105658 A   4/2000

(Continued)

OTHER PUBLICATIONS

Office Action, dated Apr. 15, 2014, issued by the Japanese Patent Office, in counterpart Application No. 2010-264777.

(Continued)

Primary Examiner — Henry Tsang
(74) Attorney, Agent, or Firm — Sughrue Mion, PLLC

(57) ABSTRACT

A terminal device includes: an application processor that processes a started application program; an operation lock determination section that determines whether to start operation lock while processing the application program; and an operation lock processor that determines whether input operation information matches operation lock information in a case where the operation lock determination section determines to start the operation lock, the operation lock information indicating an operation to be restricted while processing the started application program, the operation lock processor restricting an operation corresponding with the input operation information in a case where the input operation information matches the operation lock information.

13 Claims, 3 Drawing Sheets

(56) References Cited

U.S. PATENT DOCUMENTS

2014/0210728 A1* 7/2014 Busse ............... G06F 9/4443
345/173

FOREIGN PATENT DOCUMENTS

| JP | 2003-163739 A | 6/2003 |
| JP | 2007-156707 A | 6/2007 |
| JP | 2007-267100 A | 10/2007 |
| JP | 2009-147794 A | 7/2009 |

OTHER PUBLICATIONS

Communication dated Dec. 9, 2014 from the Japanese Patent Office in counterpart application No. 2010-264777.

* cited by examiner

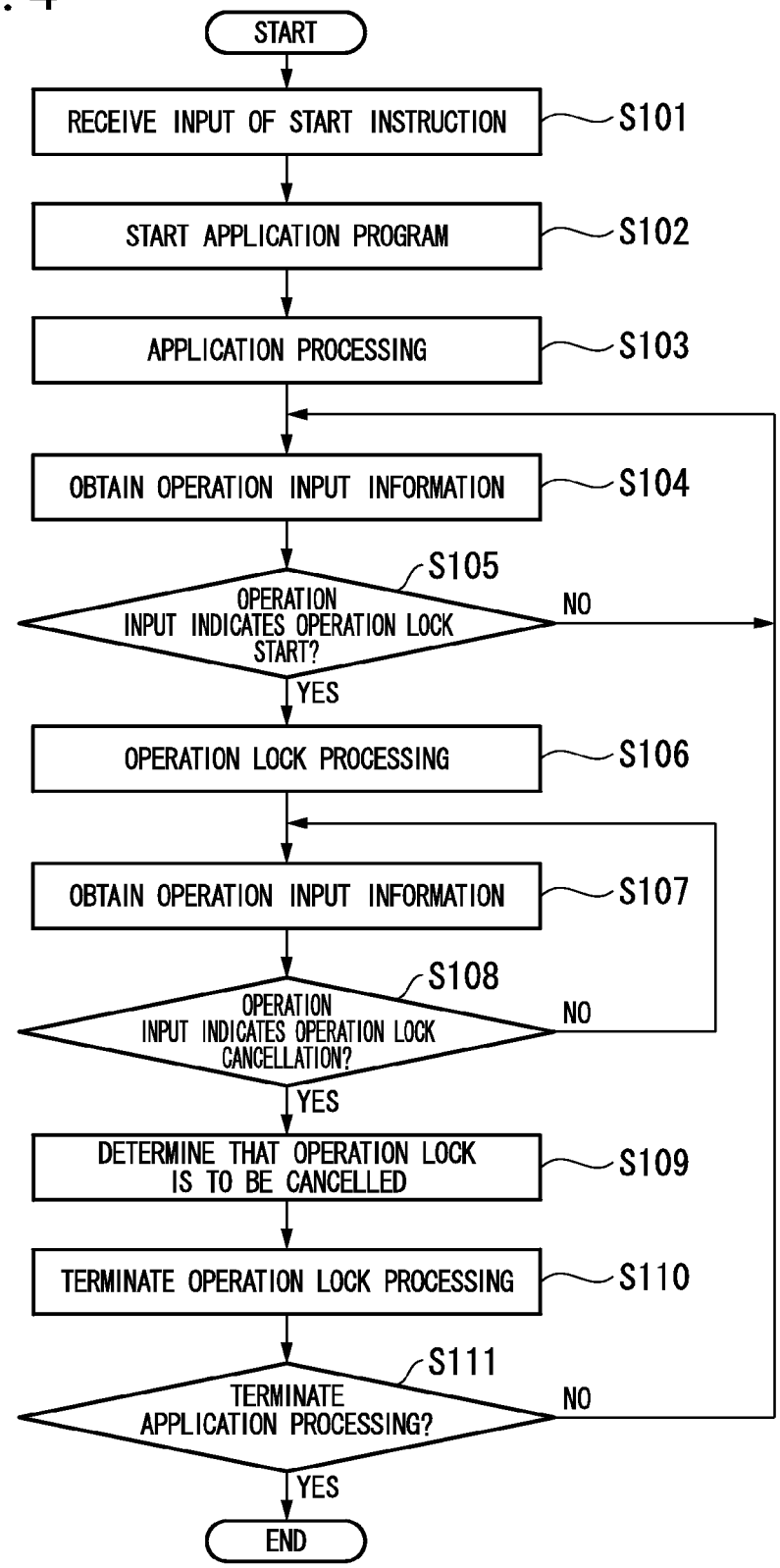

TERMINAL DEVICE FOR LOCKING OPERATION ON APPLICATION PROGRAM, AND METHOD AND PROGRAM FOR THE SAME

BACKGROUND OF THE INVENTION

Field of the Invention

The present invention relates to a terminal device that performs a process of locking operations for application processing, after the application starts, a processing method, and a program thereof.

Description of Related Art

At present, many mobile phones incorporate functions for receiving broadcasts such as television and radio, and animation display applications. Since many children are pacified when they are shown an animation using a mobile phone incorporating such a function, there are cases in which a child is handed a mobile phone in a state in which television display is started, a recorded program is played back, or an animation is displayed by an animation display application on the mobile phone. Furthermore, a child might be handed a mobile phone on which an application for children has been started, and is left for the child to play with.

However, in a state in which a mobile phone is held by a child, there are cases in which the child performs a terminal operation such as operating a key, performing an unintended operation such as terminating the application, changing the sound volume, deleting data, or cutting the terminal power.

Moreover, even in a state in which a mobile phone is not handed to a child, when an adult places the mobile phone on a table stand and watches an animation with the child, similarly, there are cases in which unintended operations are performed.

To deal with this, a technique is disclosed in Japanese Unexamined Patent Application, First Publication No. H11-308333, in which a user's physical characteristics are detected, and are compared with physical characteristics data of a usual user, which are stored in advance, and if they don't match, transmission is locked.

Furthermore, a technique is disclosed in Japanese Unexamined Patent Application, First Publication No. 2003-163739, in which it is determined whether the user is an adult or a child from contact information, and in the case where it is a child, transmitting operations or personal information access operations are restricted.

Moreover, a technique for a mobile phone terminal is disclosed in Japanese Unexamined Patent Application, First Publication No. 2009-147794, in which key operation is effective while the mobile phone is installed in a charger, and operation is restricted when it is taken off the charger.

However, all of the above-described techniques are different from a technique that restricts unintended operation while an application is being operated, so a technique that can solve such a problem is desirable.

SUMMARY OF THE INVENTION

An exemplary object of the present invention is to provide a terminal device, a processing method, and a program thereof that can solve the above problem.

A terminal device according to an exemplary aspect of the present invention includes: an application processor that processes a started application program; an operation lock determination section that determines whether to start operation lock while processing the application program; and an operation lock processor that determines whether input operation information matches operation lock information in a case where the operation lock determination section determines to start the operation lock, the operation lock information indicating an operation to be restricted while processing the started application program, the operation lock processor restricting an operation corresponding with the input operation information in a case where the input operation information matches the operation lock information.

A processing method according to an exemplary aspect of the present invention is for an operation lock in a terminal device, and includes: processing a started application program; determining whether to start operation lock while processing the application program; determining whether input operation information matches operation lock information in a case where it is determined to start the operation lock, the operation lock information indicating an operation to be restricted while processing the started application program; and restricting an operation corresponding with the input operation information in a case where the input operation information matches the operation lock information.

A non-transitory computer readable recording medium according to an exemplary aspect of the present invention stores a program. The program is for making a computer in a terminal device to function as: an application processor that processes a started application program; an operation lock determination section that determines whether to start operation lock while processing the application program; and an operation lock processor that determines whether input operation information matches operation lock information in a case where the operation lock determination section determines to start the operation lock, the operation lock information indicating an operation to be restricted while processing the started application program, the operation lock processor restricting an operation corresponding with the input operation information in a case where the input operation information matches the operation lock information.

According to the present invention, it is possible to restrict unintended operation in a terminal device, such as terminating application processing, changing the sound volume, or cutting the terminal power, while processing the application program.

BRIEF DESCRIPTION OF THE DRAWINGS

FIG. 4 is a flow chart showing processing of the terminal device shown in FIG. 1.

EXEMPLARY EMBODIMENT

Hereunder is a description of a terminal device according to an exemplary embodiment of the present invention with reference to the drawings.

Figure 1:
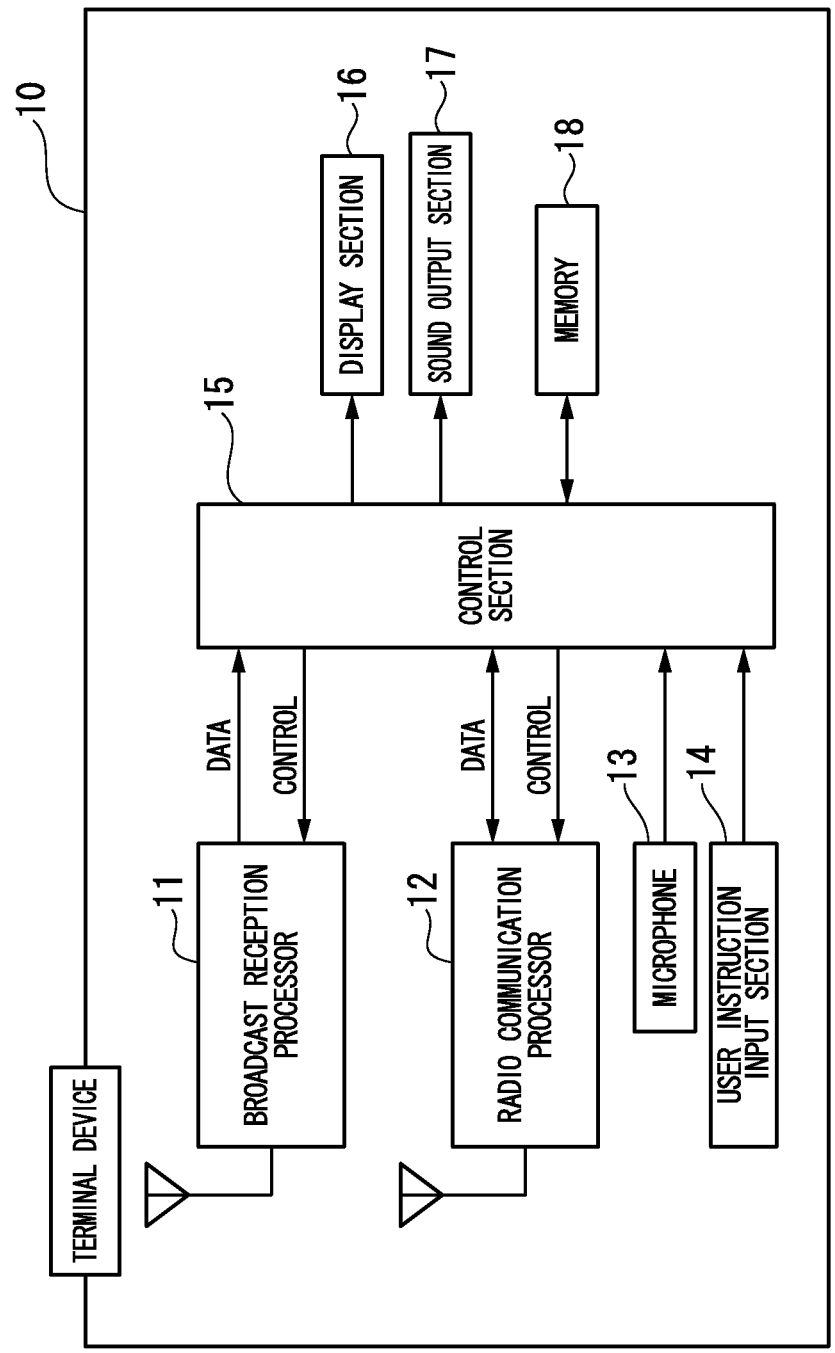
FIG. 1 is a block diagram showing a structure of a terminal device according to an exemplary embodiment of the present invention.

FIG. 1 is a block diagram showing the structure of a terminal device 10 according to the exemplary embodiment.

The terminal device 10 as shown in FIG. 1 may be a mobile phone or a PDA, for example.

As shown in FIG. 1, the terminal device 10 includes a broadcast reception processor 11, a radio communication processor 12, a microphone 13, and a user instruction input section 14. The broadcast reception processor 11 receives broadcast signals such as television or radio. The radio communication processor 12 performs radio communication with another terminal device via a base station. The microphone 13 detects sound. The user instruction input section 14 receives an input of instruction information entered by a user using a touch panel or operation keys.

The terminal device 10 further includes a control section 15, a display section 16, a sound output section 17, and a memory 18. The control section 15 controls the processors 11 and 12. The display section 16 displays information visually. The sound output section 17 outputs sound. The memory 18 stores a variety of information.

Figure 2:
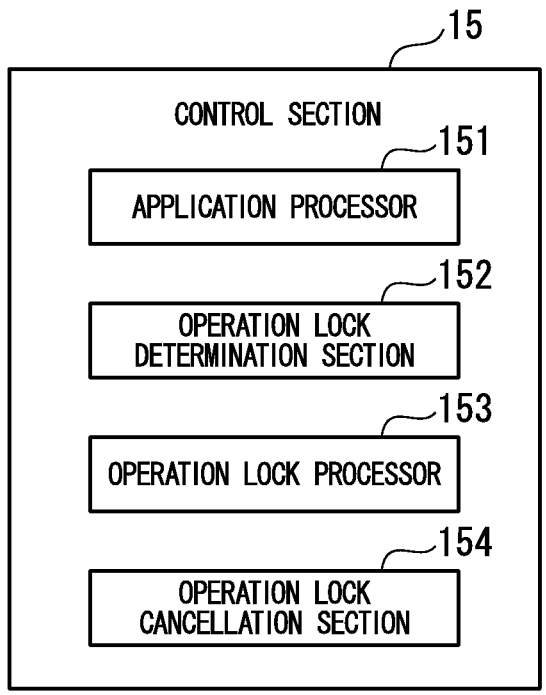
FIG. 2 is a diagram showing a functional structure of a control section provided in the terminal device shown in FIG. 1.

FIG. 2 is a diagram showing a functional structure of the control section 15 provided in the terminal device 10.

As shown in FIG. 2, the control section 15 includes an application processor 151, an operation lock determination section 152, an operation lock processor 153, and an operation lock cancellation section 154. The application processor 151 is constructed in the control section 15 by start up of an application program. The operation lock determination section 152 determines whether an operation lock for the application process is to be started. The operation lock processor 153 performs operation lock processing in the case where it is determined that the operation lock is to be started. The operation lock cancellation section 154 cancels the operation lock processing. In practice, the control section 15 includes processing functions other than the above, which are necessary for the terminal device 10 to operate. However, in the present exemplary embodiment, only those functions required for solving problems are described.

Figure 3:
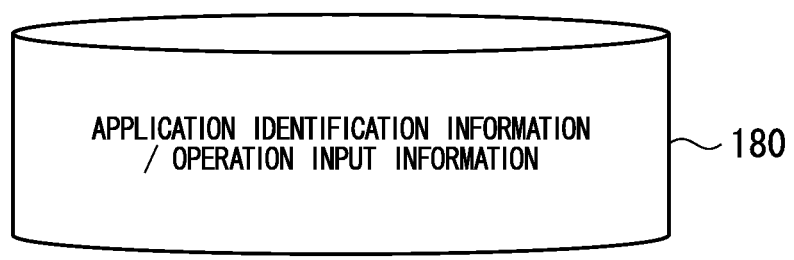
FIG. 3 is a diagram showing an example of operation lock list information stored in a memory of the terminal device shown in FIG. 1.

FIG. 3 is a diagram showing an example of operation lock list information 180 stored in the memory 18.

As shown in FIG. 3, the memory 18 stores the operation lock list information 180 in advance. The operation lock list information 180 is information in which identification information of an application program and operation input information (operation lock information) are associated. The operation input information is an object to which input restriction is applied while the application program is starting. The operation input information may be, for example, types of operation keys whose inputs are restricted, or order of pressing the operation keys. The operation lock list information 180 may be created by a user using the terminal device 10.

The terminal device 10 starts an application program stored in the memory 18 or the like. While processing the application program, the terminal device 10 determines whether to start an operation lock. In the case where it is determined to start the operation lock, the terminal device 10 determines whether input operation information matches the operation information (operation lock information) indicating an operation to be restricted while processing the started application program. In the case where they match, the terminal device 10 restricts an operation corresponding with the input operation information.

Using such processing, the terminal device 10 according to the present exemplary embodiment restricts unintended operations while an application is running.

FIG. 4 is a flow chart showing a process of the terminal device 10 according to the present exemplary embodiment.

Next is a detailed step-by-step description of the process of the terminal device according to the present exemplary embodiment.

Firstly, the control section 15 of the terminal device 10 receives an input of an instruction to start a prescribed application program from a user via the user instruction input section 14 (step S101). Then, the control section 15 starts the application program stored in the memory 18 (step S102). By so doing, the application processor 151 that performs the processing of the stared application program, is constructed in the control section 15. For example, assume that the started application program is an application program for playing an animation. In this case, the application processor 151 reads animation data predefined or as selected by the user's operation (input via the user instruction input section 14) from the memory 18, and performs reproduction processing (application processing) of the animation data (step S103).

Then, the operation lock determination section 152 in the control section 15 obtains operation input information input via the user instruction input section 14 while the animation data is being played (step S104).

The operation lock determination section 152 determines whether the operation input is an operation input indicating that an operation lock is to be started (step S105). In the case where the operation input is an operation input indicating that an operation lock is to be started, the operation lock determination section 152 determines that an operation lock is to be started.

A specific process in the determination of whether an operation lock is to be started, is as follows, for example. The memory 18 stores, in advance, operation input information (for example, one or more categories of keys, order of various types of keys pressed) indicating that an operation lock is to be started. The operation lock determination section 152 reads the operation input information from the memory 18. If the read information matches operation input information (for example, one or more categories of keys, order of various types of keys pressed) newly obtained as an operation input in the processing of the prescribed application, the operation lock determination section 152 determines that an operation lock is to be started.

Then, the operation lock determination section 152 outputs a signal indicating the start of an operation lock to the operation lock processor 153. In the case where the information obtained in step S104 is not an operation input indicating that an operation lock is to be started, the operation lock determination section 152 repeats the process for determining whether there is an operation input indicating that an operation lock is to be started.

Next, the operation lock processor 153 performs operation lock processing in which control is performed so that the signal input from the user instruction input section 14 is not output to the application processor 151 (step S106). In the operation lock processing, the operation lock processor 153 may temporary receive the signal from the user instruction input section 14, which is normally input directly to the application processor 151, in a previous step, and then cancel the signal without supplying it to the application processor 151. Alternatively, processing may be performed in which the operation of a detection section for detecting the operation keys pressed, is terminated so that it does not operate even if the operation keys are pressed.

Furthermore, as an operation lock process, the operation lock processor 153 may cancel the signal of an operation input without supplying it to the application processor 151, only in the case where the information of the operation input matches the information stored in advance in the operation lock list information 180.

For example, the operation lock processor 153 may read information regarding operation input subject to be restricted associated with identification information of an application program currently starting, from the operation lock list information 180 in the memory 18. Then, the operation lock processor 153 may compare the read information regarding the operation input subject to be restricted and information regarding operation input (key operation) received via the user instruction input section 14 (such as, kinds of keys pressed among a plurality of keys, or order of keys pressed). Then, in the case where the operation input information subject to be restricted matches the operation input information received via the user instruction input section 14, the operation lock processor 153 may determine that operation lock is to be performed.

A more specific example of this process is as follows. While an application program is running, three operating keys A, B, and C, are input (pressed) in order A→B→C, via the user instruction input section 14. Suppose that the operation lock list information 180 in the memory 18 stores operation input information including the three keys and the order of the keys A→B→C. In this case, the operation input information received via the user instruction input section 14 is cancelled without being output to the application processor 151.

In the case the screen of the terminal device 10 is a touch panel, information regarding the operation subject to the lock operation may not be key operation information, but may be information indicating an input operation on the touch panel (for example, information of a finger touching the screen). In this case, the operation input information subject to restriction may be information such as the detected time and region at which the finger touches the touch panel, or the distance from the location touched to the location where touch is removed. In the case where the information subject to restriction matches the operation input information detected by the touch panel while the application program is operating, the operation input information detected by the touch panel is cancelled without being output to the application processor 151.

After the operation lock starts, the operation lock cancellation section 154 obtains the operation input information from the user instruction input section 14 (step S107). The operation lock cancellation section 154 determines whether the operation input from the user instruction input section 14 is an operation input indicating operation lock cancellation. The operation lock cancellation section 154 determines that the operation lock is to be cancelled in the case where the operation input from the user instruction input section 14 is an operation input indicating operation lock cancellation (step S109). To be more specific, the operation input information indicating operation lock cancellation is stored in advance for example in the memory 18 or the like, similarly to the operation input information indicating operation lock start. The operation lock cancellation section 154 reads the information, and in the case where the read information matches information newly obtained as an operation input while the operation lock operation is running, the operation lock cancellation section 154 determines that the operation lock is to be cancelled.

Then, the operation lock cancellation section 154 outputs a signal indicating the cancellation of an operation lock to the operation lock processor 153, and the operation lock processor 153 terminates the processing of the operation lock (step S110). As a result of the processing of step S107, in the case where the operation lock processor 153 determines that the operation lock is not to be cancelled, the processing to determine whether there is an operation input indicating operation lock cancellation is repeated.

Afterwards, the operation lock determination section 152 determines whether the application is terminated (step S111), and if it is not terminated, the process returns to step S104, and the processes from step S104 to step S111 are repeated.

According to the abovementioned processing, it is possible to restrict unintended operation such as terminating the application processing, changing the sound volume, or cutting the terminal power, while continuing the processing of the application program.

In the processing of step S104 and step S105, in the case where operation input information is obtained, a process is performed to determine whether it is an operation input indicating operation lock start. As an alternative method, before the application program starts, a user may perform an operation that starts a program called "child mode" in the terminal device 10. As a result, the operation lock determination section 152 is constructed in the control section 15. The operation lock determination section 152 determines that an operation lock is to be started in the case where a predetermined time has elapsed from when the application program started. In this case, the processing after it is determined that an operation lock is to be started is the same as the processing described above. The arrangement may also be such that after the operation lock cancellation, it is determined automatically that an operation lock is to be started again after a predetermine time elapses, and the operation lock processing starts. In this case, when another application is started after terminating the application that had started, an operation lock is started automatically after the other application is started, which simplifies the operation.

A "child mode" program is not limited to determining whether or not an operation lock is to be started for application processing based on a video reproduction application program. The "child mode" program may also determine whether or not, in relation to all application programs stored in the terminal device 10, such as animation reproduction application programs such as television reception and reproduction, application programs for children, and the like, an operation lock is to be started for that application processing based on the operation of the program.

In the case of an application that is operated for entertainment, other than applications for children only reproducing images and sound, only application process operations may be enabled, and starting other applications or terminating the application while running may be restricted by an operation lock.

Moreover, also in animation reproduction applications and other applications, there is no limitation toward the situation of restricting all operations. Partial operation such as channel changing in television reception and reproduction applications may be permitted, or permitted operations may be specified by user settings.

Any method of starting and cancelling an operation lock may be used. For example, a specific key operation, a specific touch operation, a chassis operation such as opening or closing the terminal, and a locking hardware operation such as a specific locking key can be considered.

Furthermore, it may be recognized whether operation is performed by a child from the size of the finger touch, the size of the contacting part of a hand holding a terminal device, the pressure when operating, recognition of a face captured by a camera, and deduction from operation history. In the case where it is determined that it is operated by a child, the operation may be locked or partially restricted.

The exemplary embodiment of the present invention is described as above. The abovementioned terminal device has an internal computer system. The steps of each of the abovementioned processes may be stored in a computer-readable recording medium in the form of a program, and by reading and executing this program by a computer, the above-described processes may be performed. The computer-readable recording medium may be a magnetic disc, a magneto-optical disc, a CD-ROM, a DVD-ROM, a semiconductor memory, or the like. Moreover, this computer program may be delivered to a computer via a communication line, and the computer receiving this delivery may execute the program.

Furthermore, the above-described program may be a program that realizes some of the aforementioned functions. Moreover, the program may be one that can be realized by a combination of programs in which the aforementioned functions are already stored in the computer system, that is, a so-called differential file (differential program).

What is claimed is:

1. A terminal device comprising:
an application processor, implemented with hardware, that processes a started application program;
an operation lock determination section, comprising at least one hardware processor, that determines whether operation of the terminal device is performed by a child, and determines to start operation lock in a case where it is determined that the operation is performed by the child; and
an operation lock processor, implemented with hardware, that determines whether received user input operation information matches operation lock information stored in the terminal device in a case where the operation lock determination section determines to start the operation lock, the operation lock information indicating an operation to be restricted while processing the started application program, the operation to be restricted including an operation of cutting power of the terminal device, the operation lock processor restricting an operation corresponding with the input operation information in a case where the input operation information matches the operation lock information,
wherein, in a case where the input operation information indicates an operation of channel changing in a television reception and reproduction application program started in the terminal device, the operation lock processor determines that the input operation information does not match the operation lock information and permits the channel changing operation.

2. The terminal device according to claim 1, wherein the operation lock determination section determines to start the operation lock only for the started application program in a case where the started application program matches a predetermined application program.

3. The terminal device according to claim 1, further comprising:
an operation lock cancellation section comprising at least one hardware processor that compares a received operation input with predetermined operation input information indicating operation lock cancellation, and the operation lock cancellation section cancels the operation lock in a case where the received operation input matches the predetermined operation input information.

4. The terminal device according to claim 1, wherein the operation lock determination section determines to start the operation lock based on an input indicating start of the operation lock.

5. The terminal device according to claim 1, wherein the operation lock determination section determines whether the operation is performed by the child from a size of a finger touch.

6. The terminal device according to claim 1, wherein the operation lock determination section determines whether the operation is performed by the child from a size of a contacting part of a hand holding the terminal device.

7. The terminal device according to claim 1, wherein the operation lock determination section determines whether the operation is performed by the child from pressure when operating.

8. The terminal device according to claim 1, wherein the operation lock determination section determines whether the operation is performed by the child from recognition of a face.

9. The terminal device according to claim 1, wherein the operation lock determination section determines whether the operation is performed by the child from deduction from operation history.

10. A processing method for an operation lock in a terminal device, the method comprising:
processing, by an application processor, a started application program;
determining, by an operation lock determination section, whether operation of the terminal device is performed by a child;
determining, by the operation lock determination section, to start operation lock in a case where it is determined that the operation is performed by the child;
determining, by an operation lock processor, whether received user input operation information matches operation lock information stored in the terminal device in a case where it is determined to start the operation lock, the operation lock information indicating an operation to be restricted while processing the started application program, the operation to be restricted including an operation of cutting power of the terminal device; and
restricting, by the operation lock processor, an operation corresponding with the input operation information in a case where the input operation information matches the operation lock information,
wherein, in a case where the input operation information indicates an operation of channel changing in a television reception and reproduction application program started in the terminal device, it is determined that the input operation information does not match the operation lock information and the channel changing operation is permitted.

11. The processing method according to claim 10, wherein determining whether to start the operation lock comprises determining to start the operation lock only for the started application program in a case where the started application program matches a predetermined application program.

12. A non-transitory computer readable recording medium storing a program when executed by a computer in a terminal device, causes the computer to function as:

an application processor that processes a started application program;

an operation lock determination section that determines whether operation of the terminal device is performed by a child, and determines to start operation lock in a case where it is determined that the operation is performed by the child; and an operation lock processor that determines whether received user input operation information matches operation lock information stored in the terminal device in a case where the operation lock determination section determines to start the operation lock, the operation lock information indicating an operation to be restricted while processing the started application program, the operation to be restricted including an operation of cutting power of the terminal device, the operation lock processor restricting an operation corresponding with the input operation information in a case where the input operation information matches the operation lock information, wherein, in a case where the input operation information indicates an operation of channel changing in a television reception and reproduction application program started in the terminal device, the operation lock processor determines that the input operation information does not match the operation lock information and permits the channel changing operation.

13. The non-transitory computer readable recording medium according to claim 8, wherein the operation lock determination section determines to start the operation lock only for the started application program in a case where the started application program matches a predetermined application program.

\* \* \* \* \*

UNITED STATES PATENT AND TRADEMARK OFFICE
CERTIFICATE OF CORRECTION

PATENT NO. : 9,904,779 B2
APPLICATION NO. : 13/761734
DATED : February 27, 2018
INVENTOR(S) : Ayako Matsunaga Page 1 of 1

It is certified that error appears in the above-identified patent and that said Letters Patent is hereby corrected as shown below:

In the Claims

Column 10, Line 12; In Claim 13, delete "claim 8," and insert --claim 12,-- therefor Signed and Sealed this
Thirtieth Day of July, 2019

Andrei Iancu
*Director of the United States Patent and Trademark Office*